US009810296B2

(12) United States Patent
Pfeifer et al.

(10) Patent No.: US 9,810,296 B2
(45) Date of Patent: Nov. 7, 2017

(54) BELT TENSIONING DEVICE (71) Applicant: Muhr und Bender KG, Attendorn (DE)

(72) Inventors: Simon Pfeifer, Plettenberg (DE); Joachim Jud, Daaden (DE); Stefan Schattenberg, Attendorn (DE); Jan Rueenauver, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 161 days.

(21) Appl. No.: 14/936,982

(22) Filed: Nov. 10, 2015

(65) Prior Publication Data

US 2016/0146312 A1    May 26, 2016

(30) Foreign Application Priority Data

Nov. 21, 2014  (DE) .................. 10 2014 117 094

(51) Int. Cl.
*F16H 7/08*   (2006.01)
*F16H 7/12*   (2006.01)

(52) U.S. Cl.
CPC ............. *F16H 7/08* (2013.01); *F16H 7/1281* (2013.01); *F16H 2007/081* (2013.01);
(Continued)

(58) Field of Classification Search
CPC . F16H 7/08; F16H 7/12; F16H 7/1281; F16H 2007/0804; F16H 2007/0806;
(Continued)

(56) References Cited

U.S. PATENT DOCUMENTS 4,758,208 A    7/1988  Bartos et al.
8,821,328 B2 *  9/2014  Jud ...................... F16H 7/1281
                                                              474/134
(Continued)

FOREIGN PATENT DOCUMENTS

DE    102011053869 A1 *  3/2013  ........... F16H 7/1281
DE    102013102562 A1 *  9/2014  ................ F16F 1/04
(Continued)

*Primary Examiner* — William E Dondero
*Assistant Examiner* — Robert T Reese
(74) *Attorney, Agent, or Firm* — Bejin Bieneman PLC (57) ABSTRACT

A belt tensioning device comprises a base member having an attachment portion and an opening for a drive shaft; first and second tensioning arms that are pivotably supported by first and second bearings on the base member around first and second pivot axes and have first and second tensioning rollers 5, 7. A spring arrangement pretensions the two tensioning arms in a circumferential direction towards each other; wherein the spring arrangement has at least one bow-shaped spring that has a circumferential extension of less than 360° around the first and the second pivot axis; wherein the at least one bow-shaped spring has first and second support portions that are supported on the first and second tensioning arm as well as a spring portion extending between the first and second support portion; wherein the at least one bow-shaped spring has an axial length in the area of the first and the second support portion which is axially shorter than a total axial length of the bow-shaped spring.

17 Claims, 5 Drawing Sheets

(52) U.S. Cl.
CPC ............ *F16H 2007/0804* (2013.01); *F16H 2007/0842* (2013.01); *F16H 2007/0865* (2013.01); *F16H 2007/0874* (2013.01); *F16H 2007/0893* (2013.01)

(58) Field of Classification Search
CPC ....... F16H 2007/081; F16H 2007/0842; F16H 2007/0865; F16H 2007/0874; F16H 2007/0893
See application file for complete search history.

(56) References Cited

U.S. PATENT DOCUMENTS

| | | | |
|---|---|---|---|
| 9,453,561 B2 * | 9/2016 | Zacker | F16H 7/1218 |
| 9,523,415 B2 * | 12/2016 | Schauerte | F16H 7/1281 |
| 2008/0070730 A1 * | 3/2008 | Nelson | F16H 7/1254 474/134 |

FOREIGN PATENT DOCUMENTS

| | | | | |
|---|---|---|---|---|
| EP | 2128489 A2 * | 5/2008 | | F16H 7/12 |
| EP | 2778472 A1 | 9/2014 | | |

* cited by examiner

BELT TENSIONING DEVICE

CROSS-REFERENCE TO RELATED APPLICATIONS

This application claims priority to German Application No. DE 10 2014 117 094.6, filed on Nov. 21, 2014, which application is hereby incorporated herein by reference in its entirety.

BACKGROUND

A belt drive generally comprises an endless belt and at least two pulleys, of which one can operate as a drive and one can operate as an output of the belt drive. Such belt drives are especially used on combustion engines of a motor vehicle for driving accessories, wherein a first pulley is connected to the crankshaft of the combustion engine and drives the belt. Further pulleys are assigned to the accessories, like for example water pump, alternator or air conditioning compressor, and are rotatingly driven by the belt drive. In common belt drives, the accessories are configured as consumers, i.e. they are driven by the pulley of the crankshaft via the belt. In this case, an undriven portion (slack side) of the belt is formed between the crankshaft and the accessory adjoining the crankshaft in circumferential direction of the belt, said adjoining accessory typically being a generator. To ensure a sufficient wrap of the belt around the pulley, the belt is pretensioned by a tensioning roller of the belt tensioning device.

From DE 10 2011 053 869 A1 a belt tensioning device with exactly one tensioning arm is known, which is supported via a coil spring relative to the base member in a circumferential direction.

Also belt drives are known, in which a starter generator is integrated in the belt drive as further accessory, i.e., an electric motor, which depending on the operational condition can be operated as a starter or as an electric generator. In such belt drives with starter generator as an accessory between the engine operation on the one hand and the starter operation on the other hand a change between the driving portion and the driven portion takes place to both sides of the pulley of the starter generator. Thus it is necessary to provide spring loaded tensioning rollers for both of the named portions, of which respectively one is acting on the driven portion of the belt by means of the spring force, while the other is pushed away from the tensioned portion of the belt.

From DE 2013 102 562 A1, such a belt tensioning device with two tensioning arms is known, which are supported on each other by a spring in circumferential direction. The spring has a number of at least 1.25 and at maximum 2.5 windings.

From EP 2 128 489 A2 a belt tensioning device for a belt drive comprising a starter-generator is known. The belt tensioning device has a housing, in which two tensioning arms are pivotably supported around a common pivot axis. The tensioning arms are supported on each other by spring means. The housing is mountable in a drive pulley mounted on the starter-generator such that the housing is free of contact relative to the starter-generator in an annular portion enclosing the drive shaft of the starter-generator.

From US 2008/0070730 A1 a tensioner for tensioning a flexible drive member is known. The tensioner comprises a curve-shaped spring spine and wheels to engage the belt.

The space availability around the generator axis as well as in front of and behind the belt plane is especially limited for two tensioning devices or double arm tensioners. Furthermore, mounting of the belt is difficult not at least because of the space conditions. Depending of the design of the belt tensioner, high resulting torques may act on the belt tensioner, which may lead to an increased wear. Furthermore, the expenditure for manufacturing the spring for the belt tensioner is very cumbersome.

SUMMARY

Disclosed herein is a belt tensioning device for a belt-driven starter-generator. The belt tensioning device that is especially compact with respect to axial space in front of and behind the belt plane, which can be produced in a simple manner and which can be easily mounted. Furthermore an accessory arrangement with such a belt tensioning device is proposed, which has a compact design, which can be easily mounted and, furthermore, which can avoid the above named disadvantages.

A solution is a belt tensioning device comprising: a base member that has an attachment portion for being attached to an accessory, and an opening for a drive shaft of the accessory; a first tensioning arm that is pivotably supported on the base member around a first pivot axis by a first bearing and has a first tensioning roller that is rotatable around a first axis of rotation; a second tensioning arm that is pivotably supported on the base member around a second pivot axis by a second bearing and has a second tensioning roller that is rotatable around a second axis of rotation; a spring arrangement that is arranged between the first tensioning arm and the second tensioning arm such that the first tensioning arm and the second tensioning arm are pretensioned in a circumferential direction towards each other by the spring arrangement; wherein the spring arrangement comprises at least one bow-shaped spring that has a circumferential extension of less than 360° around the first and the second pivot axis; wherein the at least one bow-shaped spring has a first support portion that is supported on the first tensioning arm, and a second support portion that is supported on the second tensioning arm, as well as a spring portion extending between the first support portion and the second support portion; wherein the at least one bow-shaped spring has an axial length in the area of the first and the second support portion, which axial length is shorter than a total axial length of the bow-shaped spring.

An advantage is that, due to the design of the bow-shaped spring having a short axial length in the area of the tensioning rollers, the belt tensioning device has a particularly flat structure in an axial direction. The spring arrangement has a minimal axial installation height in the circumferential portions in which the tensioning rollers are arranged, i.e., in which the spring arrangement is supported on the tensioning rollers, said installation height, in an extreme case, can also be smaller or the same as the largest wire diameter of the spring wire. In this manner the force introduction from the bow-shaped spring into the two tensioning arms is achieved in a plane, which is arranged axially between an attachment plane of the housing and an edge of the tensioning rollers facing the housing. The named axial length in the area of the support portions, respectively the overall axial total length, can relate to a spring axis around which the spring is wound, and/or to a pivot axis of the tensioning arms in the mounted condition.

The belt tensioning device can be used for a belt drive, which has at least one accessory with a drive shaft and a pulley as well as an endless belt for driving the pulley. The belt tensioning device can be formed such that the two pivot axes of the tensioning arms are arranged within the opening of the housing. In the assembled condition of the belt tensioning device on the accessory, the two pivot axes are preferably arranged within a largest outer diameter of the pulley and of the drive shaft, respectively, more particularly coaxially thereto. The two pivot axes can be arranged coaxially to each other, i.e. form a common pivot axis. Furthermore, in the mounted condition, the drive shaft of the accessory can extend into the opening of the belt tensioning device.

According to an embodiment the spring arrangement is formed mirror-symmetrically in an axial view to a centre plane, which extends centrally parallel between the two axes of rotation of the tensioning rollers. The spring arrangement has at least one bow-shaped spring, which means, that one or more bow-shaped springs can be provided. As far as in the present disclosure it is referred to a or the bow-shaped spring, if nothing mentioned to the contrary, this shall mean the at least one bow-shaped spring, i.e. that the described features can be applicable for one, several, or all of the bow-shaped springs. This shall also apply for other components of the belt tensioning device, of which several are provided and which are presently described, in particular the tensioning rollers, the tensioning arms and parts thereof.

The expression bow-shaped spring refers to the shape of the spring that extends bow-shaped, i.e. arcuate around the base member. The bow-shaped spring has less than one winding, i.e., in the assembled condition it extends along a circumferential extension around the pivot axes of the tensioning arms of less than 360°, especially less than 330°. At each respective end, the bow-shaped spring has a support portion for supporting the spring on the respective tensioning arm in a circumferential direction, so that the two tensioning arms are loaded against each other. The support portions can be formed arch-like and can engage a corresponding circumferential groove at the tensioning arm, so that the spring is fixed in axial direction and in circumferential direction by accommodation of the support portions in the two circumferential grooves of the two tensioning arms. A spring portion is arranged between the two support portions, in which spring portion potential energy is stored upon elastic expansion of the spring.

When the spring is elastically expanded, the spring portion, which can also be designated as C-shaped portion or bow-shaped portion, is mainly subjected to bending stresses. The spring portion extends between the two end portions substantially arc-like in circumferential direction around a spring axis. In the assembled condition, the spring axis may be arranged approximately close to and substantially parallel to the pivot axes of the two tensioning arms. An average radius of the spring portion is larger than an average radius of the first and the second bearing, more particularly larger than an annular portion of the belt tensioning device enclosing the opening, so that between the annular portion and the spring portion a radial gap is formed. In the relaxed condition, the spring can have an average radius, which is smaller than an axis distance between a pivot axis of the tensioning arms and an axis of rotation of the tensioning roller. In the assembled condition the bow-shaped spring can have an average radius, which is larger than the axis distance between the pivot axis and the axis of rotation. The size of an angle enclosed by the two tensioning arms depends on the individual assembly condition on the accessory and can be smaller than 90° in the assembled condition. The at least one bow-shaped spring can be manufactured from a round wire or a square wire.

According to a first possibility, the bow-shaped spring can be formed such that the wire cross-section is constant along the circumferential extension of the spring. In this case, it can be especially provided, that at least a partial region of the spring portion is axially offset relative to the first and the second support portion in direction towards a centre plane defined by the first and the second tensioning roller. This can be achieved in that the spring portion has a gradient region with an axial gradient component along the circumferential extension of the bow-shaped spring. Thus, it is achieved, that an axial distance formed between the bow-shaped spring and an attachment plane of the housing, starting from an end portion of the spring, increases along the C-shaped portion in direction to the other end portion. A maximum axial distance can be formed in a central region of the C-shaped portion. From the central region towards the other end, the axial distance decreases again. The axial gradient can extend over a partial region, while a second partial region can be formed without gradient, or can extend along the whole circumferential extension of the bow-shaped portion.

According to a second possibility the at least one bow-shaped spring has a smaller axial length in the first and the second support portion than in at least one partial region of the spring portion. This can be achieved in that the bow-shaped spring is manufactured from a flat material, wherein the end portions of the flat material, which load the tensioning arms in the assembled condition, can be formed thinner than the C-shaped portion arranged therebetween. In this connection flat material means especially a metal sheet strip with a rectangular cross-section, which is formed to a bow-shaped spring.

For both possibilities it is possible that for each tensioning arm a support element is provided, on which the mating support portion of the bow-shaped spring is supported, to load the two tensioning arms towards each other. Each of the support elements can have a groove extending in circumferential direction around the axis of rotation of the respective tensioning roller, in which groove the respective arch-like end portion is form-fittingly received. To that extent, the support elements, which are connected to the respective tensioning arm, can also be designated as receiving elements. Because of the form-fitting engagement of the end portions of the spring in the two support portions, the spring is fixed in axial direction and in circumferential direction. Further attachment means are not necessary for the spring.

According to an embodiment, which is especially valid for the first possibility, the spring arrangement can have two bow-shaped springs, which are connected to each other by at least one connecting element. With the embodiment comprising two springs, the pretensioning forces acting on the tensioning arms can be increased. The two springs are functionally arranged in parallel between the two tensioning arms, i.e. both springs act with their first end portions on the first tensioning arm and act with their second end portions on the second tensioning arm. In this embodiment with two springs, the support elements have respectively two grooves for accommodating the end portions of the two springs. The two springs can be formed identically and can be arranged axially offset to each other. Alternatively, the two springs can be formed differently from one another. In the latter embodiment the first and the second support portions of the two bow-shaped springs can be arranged in a common plane, whereas the spring portions of the two springs are arranged axially offset to each other at least in partial regions, i.e., are arranged in different planes. It is especially provided that average radii of the spring portions of the two bow-shaped springs have the same size, and the average radii of the support portions of the two bow-shaped springs are differently large. Thus, it is achieved, that the spring portions of the two springs are axially offset to each other and radially overlap each other, while the support portions of the two springs are radially offset to each other and axially overlap each other.

According to an embodiment, which applies for all the above named embodiments, at least one of the components base member, first tensioning arm and second tensioning arm, is made from a steel sheet as a metal sheet formed part. Producing the base member or the tensioning arms from a steel material contributes to an axial compact design size, wherein high strength values can be achieved because of the steel material. More particularly, it can be provided that the metal sheet thickness of at least one of the components, i.e. the base member, the first tensioning arm and/or the second tensioning arm, is smaller than a wire diameter of the bow-shaped spring, which is especially valid for springs made from a round material, or smaller than a maximal axial extension of the spring material of the bow-shaped spring, which is especially valid for springs made from flat material. Thus, a particularly flat structure can be achieved, wherein the total axial length of the base member can be formed shorter than three times the wire diameter of the bow-shaped spring.

Preferably all three components, i.e. the base member and the two tensioning arms, are made from steel, i.e. more particularly in a sandwich design. For this, it can be provided that the base member has a flange portion, a sleeve portion and a cover portion, which form an accommodation chamber for supporting the first and the second tensioning arm. A flange-like bearing portion can be included radially inside the first tensioning arm, the flange-like bearing portion being encased by a bearing element and supported axially against the flange portion of the base member. A sleeve-like bearing portion can be radially within the second tensioning arm, is the sleeve-like bearing portion being radially arranged between the sleeve portion of the base member and the first tensioning arm. Also radially inside the second tensioning arm there can be a flange-like bearing portion, which is axially arranged between the first tensioning arm and the cover portion of the base member.

The first and the second tensioning arm have respectively annular bearing portions pivotably supported in the housing around the respective pivot axis. The two tensioning arms are individually pivotable, i.e. relative to the housing and relative to the respective other tensioning arm. The two tensioning arms can be designed to be without a stop relative to the housing, i.e. they can be freely rotated relative to the housing around 360° and more. Pairs of support faces are formed at the parts that are movable relative to each other. Said support faces are axially, respectively radially supported against each other by suitable low friction bearing means. Between one of the pairs of faces which are formed between the base member and the second tensioning arm, between the second tensioning arm and the first tensioning arm and/or between the first tensioning arm and the base member, an annular seal is provided. The at least one annular seal prevents an unwanted penetration of dirt into the belt tensioning device.

The annular seals can be manufactured according to one of the following: from a two component-plastic-injection molding material which is injection molded onto at least one of the components, i.e. the base member, the first tensioning arm and/or the second tensioning arm, or as an individual component, which is connected to at least one of the components, i.e. base member, first tensioning arm and/or second tensioning arm, for example in a material-locking manner by vulcanisation.

The base member, which is preferably made as a metal sheet component, has an attachment portion for attaching the belt tensioning device on a stationary component, for example the accessory or the engine housing. The attachment portion can project flange-like from the sleeve or annular portion, enclosing the opening, through which the drive shaft is guided. It is advantageous, when the attachment portion has several attachment points, on which the base member can be connected to the accessory. These attachment points can for example be formed in the shape of flange expansions of the base member, which project radially outward from the annular portion. The named attachment means are preferably arranged at least in the circumferential area, which is approximately opposed to the tensioning arms and from the drive belt, extending away from the pulley. For a reliable attachment of the belt tensioning device on the accessory it is advantageous, when the attachment means extend in an axial view towards the belt tensioning device along a circumferential portion of more than 90° and less than 270°, especially approximately from 150° to 210°.

According to a first possibility, the belt tensioning device is formed such that the bearing of the tensioning arms is arranged in an area between the attachment portion of the base member and the belt plane. This also applies for the spring arrangement, which pretensions the tensioning arms towards each other, which spring arrangement is also arranged between the centre plane of the belt and the attachment portion. The belt plane corresponds approximately to the central bearing plane, which is formed by the bearings of the tensioning rollers on the tensioning arms. A second central bearing plane is formed by the bearings of the tensioning arms on the base member.

According to a second possibility the belt tensioning device is formed such that the bearing of the tensioning arms is arranged on the base member when viewed from the unit, behind the belt plane. This means that a central plane of the tensioning arm bearing is arranged axially offset relative to the central plane of the belt in direction away from the accessory. The second central bearing plane and the attachment means for attaching the base member are in this embodiment arranged on different sides of the first central bearing plane of the tensioning rollers.

DRAWINGS

Example embodiments are described below with reference to the drawings, which are as follows.

DETAILED DESCRIPTION OF EXAMPLE EMBODIMENTS

FIGS. 1 to 5, which are jointly described in the following, show a belt tensioning device 2 according a first embodiment. The belt tensioning device 2 comprises a base member 3, a first tensioning arm 4 with a first tensioning roller 5, a second tensioning arm 6 with a second tensioning roller 7 and a spring arrangement 8, by which the two tensioning arms 4, 6 are elastically supported against each other in rotational direction.

The base member 3 can be mounted on a stationary component such as an accessory. The accessory can in principle be any machine that is part of the belt drive, e.g., especially any accessory like a generator, water pump or others, which are driven by the main engine of the motor vehicle. The base member 3 has an attachment portion 9 for connecting the device to the stationary component. More particularly, the attachment portion 9 has three circumferentially distributed flange projections 10 projecting radially outwards, with bores, through which screws can be inserted for attaching the base member on the stationary component. The belt tensioning device 2 according to the present embodiment is formed such that the bearings 22, 23, 24 of the tensioning arms 4 are axially arranged between the attachment portion 9 of the base member 3 and a central roller plane E5 of the tensioning rollers 5, 7. In the mounted condition the central roller plane E5 corresponds approximately to a belt plane formed by the belt.

Furthermore, the base member 3 has a flange portion 11 arranged radially inside the attachment portion 9, which flange portion serves for axial supporting the second tensioning arm 6. Radially inwards, the flange portion 11 merges in a sleeve portion 15, on which the first and the second tensioning arms 4, 6, respectively, are radially supported. At the free end of the sleeve portion 15, an annular disc 21 is fixed as final part. This is achieved by edge forming of an end-sided edge of the sleeve portion 15, wherein it is understood that other attachment methods can also be used. The annular disc 21 forms a support face for axially supporting the first and the second tensioning arms 4, 6, respectively. In total the annular disc 21, the sleeve portion 15 and the flange portion 11 form a receptacle for the two tensioning arms 4, 6 formed C-like in a half longitudinal sectional view.

The base member 3, the first tensioning arm 4 and the second tensioning arm 6 are in the present example formed as steel components, which can especially be produced by sheet metal forming. Steel components have the advantage of high strength with low material usage, so that in particular the tensioning arms 4, 6 can be configured in an axially flat manner. For all three components, the base member 3 as well as the first and the second tensioning arm 4, 6 it may be provided that their sheet thickness is respectively smaller than the wire diameter d of the bow-shaped spring 25. The sheet thickness of the tensioning arms 4, 6 may be slightly thicker than the sheet thickness of the base member 3. The total axial length L3 of the base member 3 can thus be shorter than three-times the wire diameter d of the bow-shaped spring 25 (L3<3d).

The first tensioning arm 4 is pivotably supported by the first bearing 22 around a first pivot axis A4. The second tensioning arm 6 is pivotably supported by the second bearing 24 around a second pivot axis A6. In the present example, the two bearings 22, 24 are formed coaxially to each other, i.e., the two pivot axes A4, A6 fall together. Generally, it is however also possible for specific applications, that the two pivot axes can be arranged parallel, i.e. eccentrically to each other. The spring arrangement 8 extending in circumferential direction around the pivot axes A4, A6, acts against a pivot movement of the two tensioning arms 4, 6 relative to each other. The two tensioning arms 4, 6 are rotatable relative to each other to a limited extent due to the spring arrangement 8 arranged therebetween, and they are freely rotatable together with the spring arrangement 8 relative to the base member around the axes A4, A6, i.e. around 360° and more. In the mounted condition on the stationary component, this free rotatability is only possible as far as packaging allows, i.e. other components being arranged proximate to the tensioning device 2. It is provided, that in the mounted condition of the belt tensioning device 2 the pivot axes A4, A6 are arranged within an opening 36 of the base member 3.

The tensioning arms 4, 6 have respective support portions 12, 13, projecting radially outward from an annular bearing portion 19, 20 of the respective tensioning arm 4, 6. A respective tensioning roller 5, 7 is mounted on each of the support portions 12, 13 and is rotatably supported by corresponding bearings 18, 18' around axes of rotation A5, A7 arranged parallel to the pivot axes A4, A6. The bearing 18 for the first tensioning roller 5 is mounted on a support element 17 connected to the support portion 12. The bearing 18 is attached by a screw 14, which is screwed into a threaded sleeve 29 supported on the support portion. The second tensioning roller 7 is rotatably supported in analogous manner on a bearing element of the second tensioning arm 6 and is attached by a screw connection 14' on the tensioning arm 6. Discs 16, 16' prevent the penetration of dirt into the bearings 18, 18' of the tensioning rollers 5, 7.

In the following, the bearing arrangement of the belt tensioning device is described in greater detail with reference to FIG. 3. At a radially inner side, the first tensioning arm 4 has a bearing portion 19 for being rotatably supported on the base member 3. The second tensioning arm 5 has a bearing portion 20 for being rotatably supported relative to the first bearing portion 19 and to the base member 3, respectively. It can also be seen that the first bearing portion 19 and the second bearing portion 20 are supported axially and radially against each other. The first bearing portion 19 is rotatably supported in the housing 3 by the first bearing 22. The first bearing 22 is formed especially as a sliding ring, formed L-shaped in cross-section, which forms an axial and radial support for the first tensioning arm 4 relative to the base member 3. The first bearing 22 is axially supported on the annular disc 21, which is fixedly connected to the sleeve portion 15. Radially inside the first bearing 22 there is included a sleeve-like bearing portion, which is radially arranged between the sleeve portion 15 of the base member 3 and a sleeve projection 30 of the first tensioning arm 4.

Between the first and the second bearing portion 19, 20 an axial bearing 23 is provided, which is formed especially as a sliding disc. The second bearing portion 20 is axially supported via a second bearing 24, which is formed as a L-shape sliding ring, relative to the base member 3 and radially supported relative to the sleeve projection 30 of the bearing portion 19. The assembly is carried out such that the bearing arrangement including the second bearing 24, the second tensioning arm 6, the axial bearing 23, the first tensioning arm 4 and the first bearing 22, is pushed onto the sleeve projection 15. Then, the annular disc 21 is pushed onto the sleeve portion 15 and the end-sided edge of the sleeve portion 15 is then bordered. In the mounted condition, the tensioning arms 4, 6 are arranged axially between the attachment portion 11 and the annular disc 21. The axial length L3 of the base member 3 respectively of the sleeve portion 15 is smaller than three times the spring wire diameter d of the bow-shaped spring 25, so that the axial installation space is especially small.

Between the components 3, 4, 6 which are rotatable relative to each other, a respective annular seal 41, 42, 43 is arranged, which prevents an unwanted penetration of dirt. A first annular seal 41 is injection molded to a radially outer end of the closure disc 21 and seals the annular chamber between the housing disc 21 and the bearing portion 19 of the first tensioning arm 4. A central annular seal 42 is connected to a radial outer edge of the second bearing 23 and seals the annular chamber between the two tensioning arms 4, 6. The annular gap between the bearing portion 20 of the second tensioning arm 6 and the flange portion 11 of the housing 3 is sealed by a second annular seal 43, which is connected to a radial outer edge of the first bearing 22. The second bearing 24 can be produced together with the second annular seal 43 by means of a two-component-plastic injection molding. This is correspondingly also applicable for the central bearing 23 with the central seal 42.

Figures 1, 2:
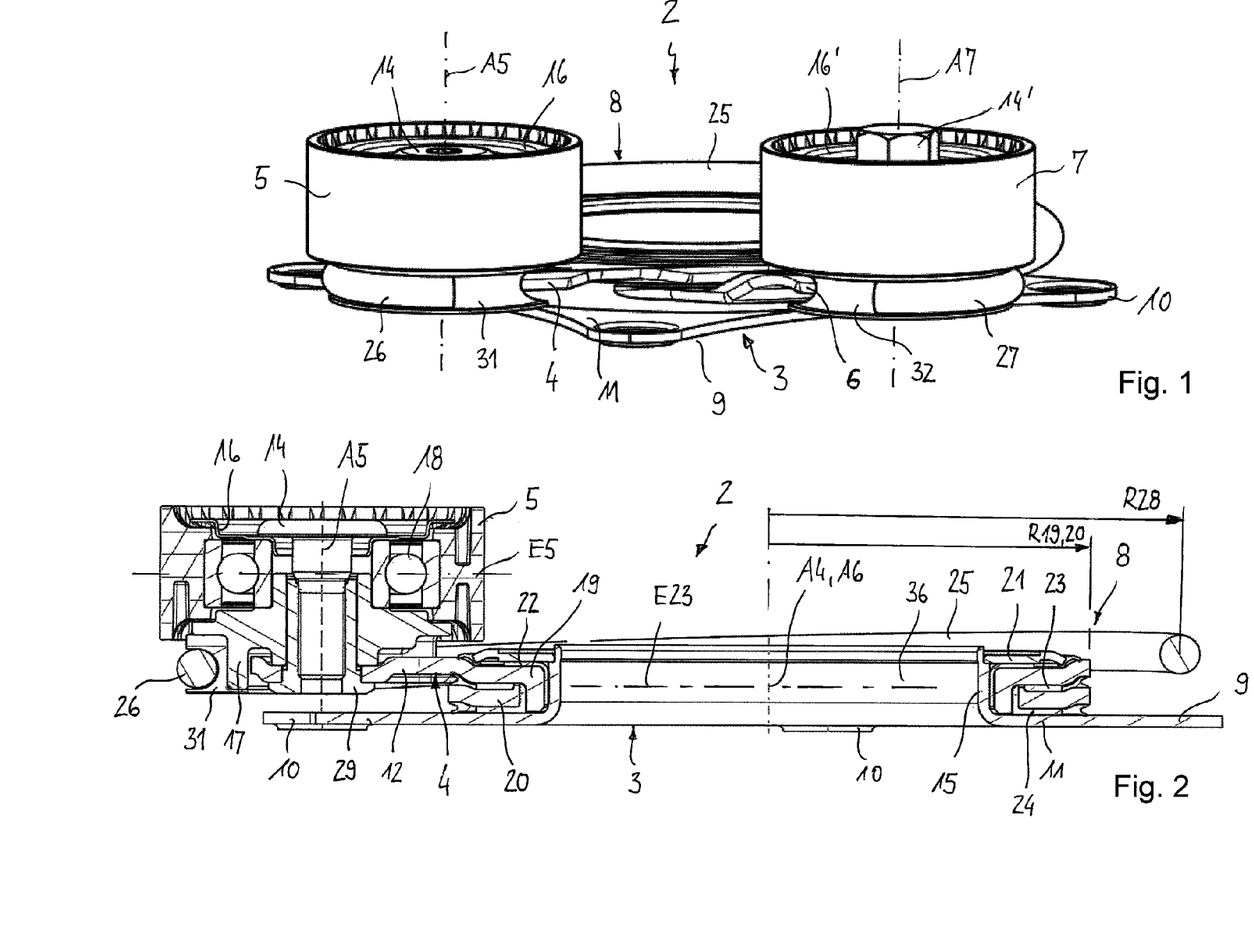
FIG. 1 illustrates an example belt tensioning device in a perspective view from the side.
FIG. 2 illustrates the belt tensioning device of FIG. 1 in a longitudinal sectional view.
Figure 3:
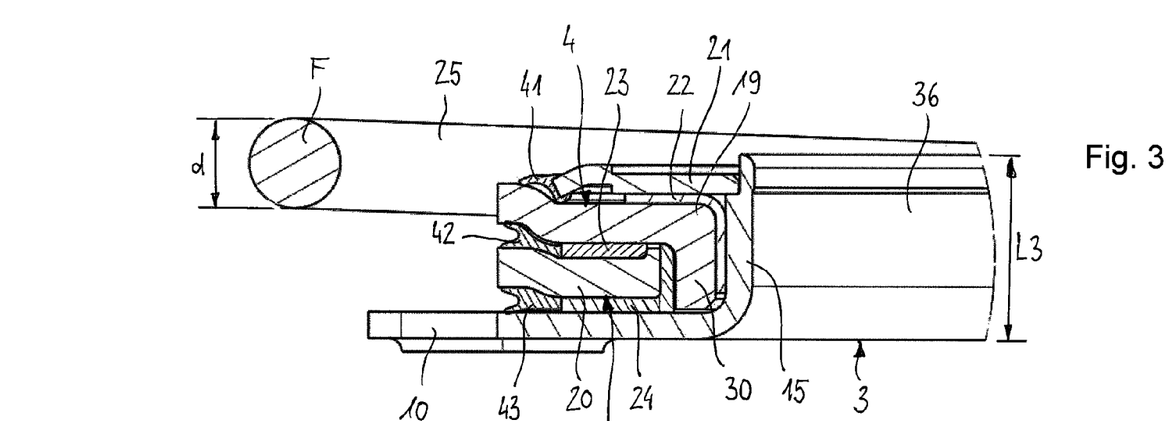
FIG. 3 illustrates the bearing arrangement of the belt tensioning device of FIG. 1 as a detail in a half longitudinal sectional view.
Figure 4:
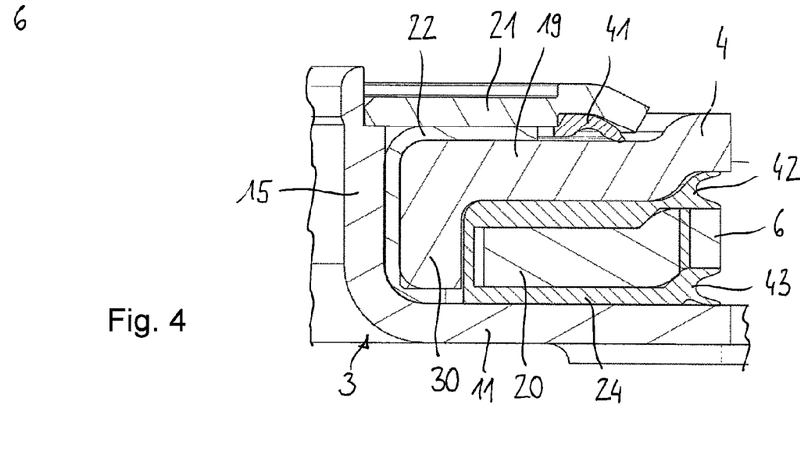
FIG. 4 illustrates a bearing arrangement as a detail of a belt tensioning device according to a modified embodiment.

In FIG. 4 a slightly modified embodiment of the bearing arrangement is shown, which widely corresponds to the bearing arrangement of FIG. 3, to which description it is hereby referred to as far as common features are concerned. As compared to the embodiment of FIG. 3, a difference of the embodiment of FIG. 4 is that the first seal 41 is arranged axially between the annular disc 21 and an annular face of the bearing portion 19. The seal 41 is connected to a lower side of the annular disc 21 in a material-locking manner, for example by vulcanisation or gluing. The central seal 42 and the second seal 43 are formed integrally with the second bearing 24, which for example can be achieved by two-component-injection molding. The first bearing 22 is formed C-shaped in cross-section. This can be achieved by way of a forming operation at the lower and upper end of a bearing sleeve.

The spring arrangement 8 comprises at least one bow-shaped spring 25 with a first support portion 26 that is circumferentially supported against the first tensioning arm 4, and with a second support portion 27 that is circumferentially supported against the second tensioning arm. The support portions 26, 27 form the ends of the bow-shaped spring 25 and can therefore also be referred to as end portions. The end portions are formed arch-like and engage in corresponding circumferential grooves of a support element 31, 32 connected to a respective one of the tensioning arms 4, 6. The support elements 31, 32 are each pushed onto the corresponding support element 17 of the tensioning arm 4, 6 from below. Because of the form-fitting engagement of the end portions 26, 27 in the corresponding support elements 31, 32 the bow-shaped spring 25 is fixed in axial direction and in circumferential direction. A free spring portion 28 of the bow-shaped spring 25 extends between the two support portions 26, 27. In said free spring portion 28 the potential energy is stored during expanding of the spring. The bow-shaped spring 25 is formed mirror-symmetrically relative to a centre plane extending between the two end portions.

Figures 5, 6, 7:
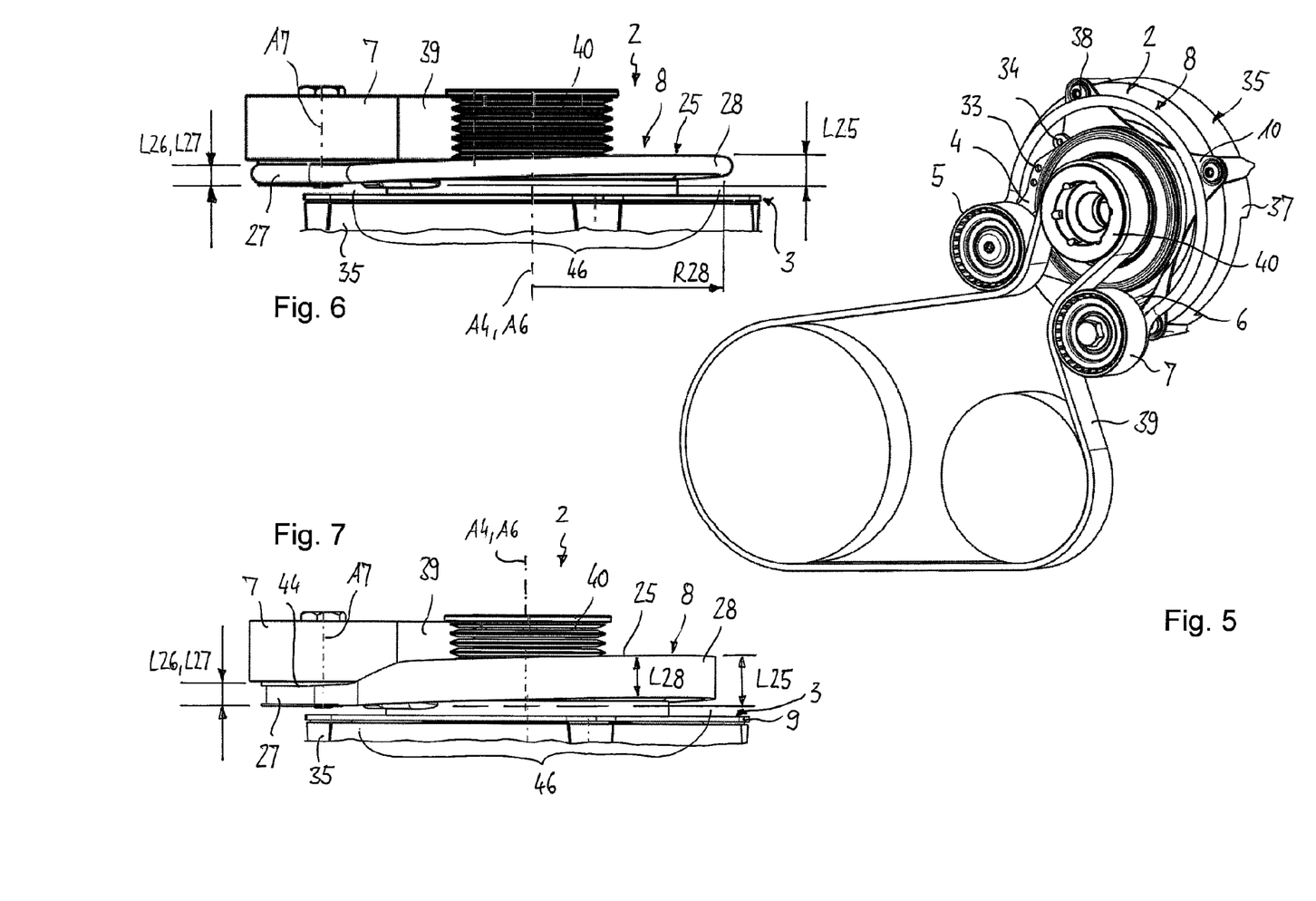
FIG. 5 illustrates the belt tensioning device of FIG. 1 in a perspective view in the mounted condition on an accessory.
FIG. 6 illustrates the belt tensioning device of FIG. 1 in a side view in the mounted condition on an accessory.
FIG. 7 illustrates a further example of a belt tensioning device in a side view in the mounted condition on an accessory.

It is especially visible in FIG. 5 that the bow-shaped spring 25 has a circumferential extension of less than 360° around the first and the second pivot axis A4, A6. In this case, an average, i.e. middle radius R28 of the spring portion 28 of the bow-shaped spring 25 is larger than a largest radius of the bearing 22, 23, 24 for the tensioning arms 4, 6, respectively larger than a largest radius R19, R29 of the annular bearing portions 19, 20 of the two tensioning arms 4, 6. It can be seen especially in FIG. 6 that the total axial length L25 of the bow-shaped spring 25 is larger than the axial length L26, 27 of the bow-shaped spring in the area of the tensioning rolls 5, 7, respectively in the area of the support portions 26, 27. This is achieved such that, in the present embodiment, a region of the spring portion 28 arranged opposite to the tensioning rollers 5, 7 is axially offset relative to the first and the second support portion 26, 27 in direction away from the attachment portion 9 of the base member 3. For this, the spring portion 27 has with regard to the pivot axes A4, A6 an axial gradient component between the two support portions 26, 27, which can be seen in particular in FIG. 2. In this manner it is achieved, that the spring portion 28 has a larger axial distance relative to neighbouring components and is free of contact relative thereto also during arising vibrations. The bow-shaped spring 25 is produced from a round material and has a constant cross-section along the extension of the spring.

In the assembled condition, the bow-shaped spring 25 is strongly pretensioned in circumferential direction, i.e., the spring is expanded relative to its relaxed condition, so that the spring acts on the two tensioning arms 4, 6 in a direction towards each other. For (preliminary) fixing of the pretensioned position, the tensioning arms 4, 6 are moved away from each other against the pretensioning force of the spring and a securing pin is pushed into a first bore 33 in the first tensioning arm 4 and a second bore 34 in the second tensioning arm 6. After the mounting of the belt tensioning device 2 on the accessory 35 and applying the belt 39, the securing pin is pulled out, so that the tensioning arms 4, 6 are loaded towards each other by the bow-shaped spring 25 in circumferential direction and the tensioning rollers 5, 7 tension the belt 39.

FIGS. 5 and 6 show the belt tensioning device 2 according to the invention of FIGS. 1 to 4 in the mounted condition on an accessory 35. In this case, the belt tensioning device 2 and the accessory 35 form together an accessory unit. The accessory 35 is configured as a generator (dynamo) in the present case. The housing 37 of the generator is visible, which can be connected via attachment means on an engine block. It is understood however, that the accessory can also be a different working machine, which is part of the belt drive, for example an accessory, like a pump.

The belt tensioning device 2 is attached at an end side of the generator 35. This is achieved by circumferentially distributed connection flanges 10, into which screws 38 are inserted and bolted to the housing 37 of the generator 35. Further, the endless belt 39 and the pulley 40 are visible, which pulley can be connected to the drive shaft of the generator 35 in a rotationally fixed manner by a bolted connection.

The base member 3, respectively the belt tensioning device 2 is formed such that—in the mounted condition of the belt tensioning device 2 on the accessory 35—the pivot axes A4, A6 of the tensioning arms 4, 6 are arranged within the outer diameter of the drive shaft, preferably substantially coaxially to the axis of rotation of the drive.

FIG. 7 shows a belt tensioning device 2 according to the invention in a further embodiment. The present belt tensioning device 2 widely corresponds to the embodiment of FIGS. 1 to 6, so that as far as common features are concerned, reference is made to the above description. Thereby, the same or modified components are provided with the same reference numerals as in FIGS. 1 to 6.

A difference of the embodiment of FIG. 7 refers to the design of the spring arrangement 8. In the present embodiment, the spring arrangement comprises a bow-shaped spring 25, which is made from a flat material. "Flat material," in the present context, shall mean that a sheet metal strip with a rectangular cross-section is used as the starting material. The support portions, i.e., end portions 26, 27 of the bow-shaped spring 25, which are supported on the tensioning arms 4, 6, have a smaller axial length L26 than the total axial length L25 of the bow-shaped spring 25 and than the axial length L28 of the spring portion 28. This can be achieved in that the sheet metal strip is cut before being formed to a bow-shaped spring at its end portions, so that recesses 44 are produced in these areas. These recesses 44 offer space for the tensioning rollers 5, 7, so that the axial structure is overall small. The spring portion 28 has starting from the end portions 26, 27 in circumferential direction an axial gradient component, so that a central region of the spring portion 28 has a maximal axial distance from the attachment part 9. For the rest, the present embodiment corresponds to the above described embodiment, to which description it is hereby referred concerning further details.

Figure 8:
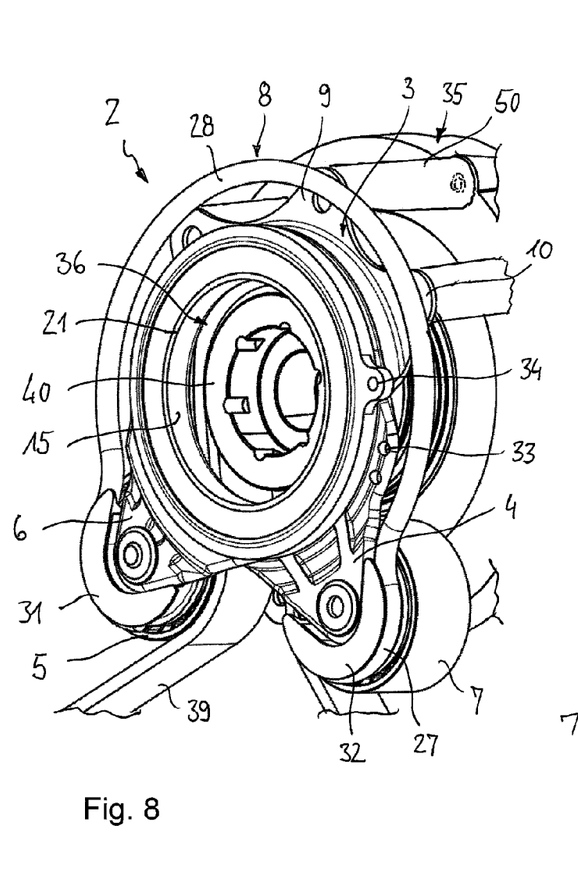
FIG. 8 illustrates a further example of a belt tensioning device in the mounted condition on an accessory in a perspective view.

FIG. 8 shows a belt tensioning device 2 in a further embodiment. This corresponds in many parts to the embodiment of FIGS. 1 to 6, so that as far as common features are concerned it is referred to the above description. In this regard, the same or modified components are provided with the same reference numerals, as in the embodiment of FIGS. 1 to 6. In the following mainly the differences of the present embodiments are described.

In the embodiment of FIG. 8, the belt tensioning device 2 is formed such, that the bearings for supporting the tensioning arms 4, 6 on the base member 3 are arranged behind the belt plane if viewed from the accessory 35. This means that a central plane of the bearings of the tensioning arms 4, 6 on the base member 3 is arranged axially offset relative to a central plane E5 of the tensioning rollers 5, 7 and of the belt 39, respectively, in direction axially away from the accessory. The belt plane is defined by a plane which is formed by the belt centre in the mounted condition. The attachment portion 9 of the base member 3 is connected to the housing 35 of the accessory by intermediate elements 50.

Figure 9:
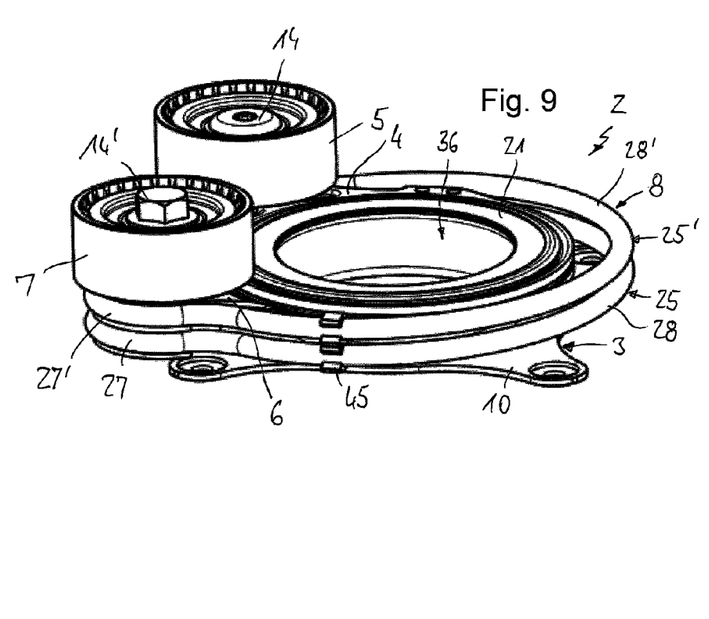
FIG. 9 illustrates a further example of a belt tensioning device in a perspective view.
Figure 10:
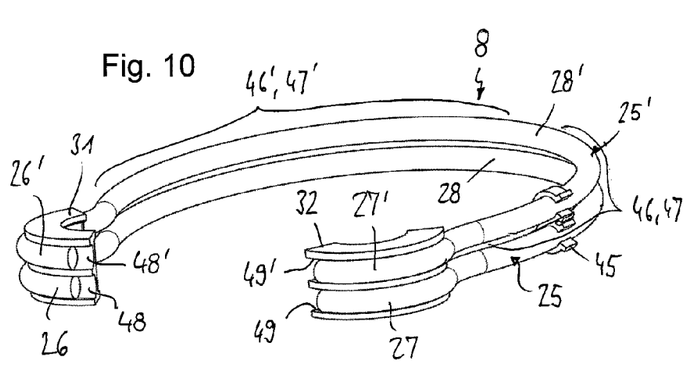
FIG. 10 illustrates the spring arrangement of the belt tensioning device of FIG. 9 as a detail in a perspective view.

FIGS. 9 and 10, which are described jointly below, show a belt tensioning device 2 including a spring arrangement 8 in a further embodiment. The present belt tensioning device 2 widely corresponds to the embodiment of FIGS. 1 to 6, so that as far as common features are concerned, reference is made to the above description. The same or modified components are provided with the same reference numerals as in FIGS. 1 to 6.

A characteristic design feature of the present embodiment refers to the spring arrangement 8. The spring arrangement presently comprises two bow-shaped springs 25, 25', which are equally formed, i.e. have the same shape, and are arranged parallel to each other. Each of the two bow-shaped springs 25, 25' is formed as in the embodiment of FIGS. 1 to 6. The two bow-shaped springs 25, 25' are connected to each other by one or more attachment elements 45 forming an axial gap. The end portions 26, 27; 26', 27' are received in support elements 31, 32, each having two arch-like grooves. The support elements 31, 32 are connected to the respective tensioning arm 4, 6 as in the embodiment of FIGS. 1 to 6. By means of the design of the two bow-shaped springs 25, 25' the pretensioning force, acting on the tensioning arms 4, 6, is increased relative to the embodiment of FIG. 1.

Figures 11, 13:
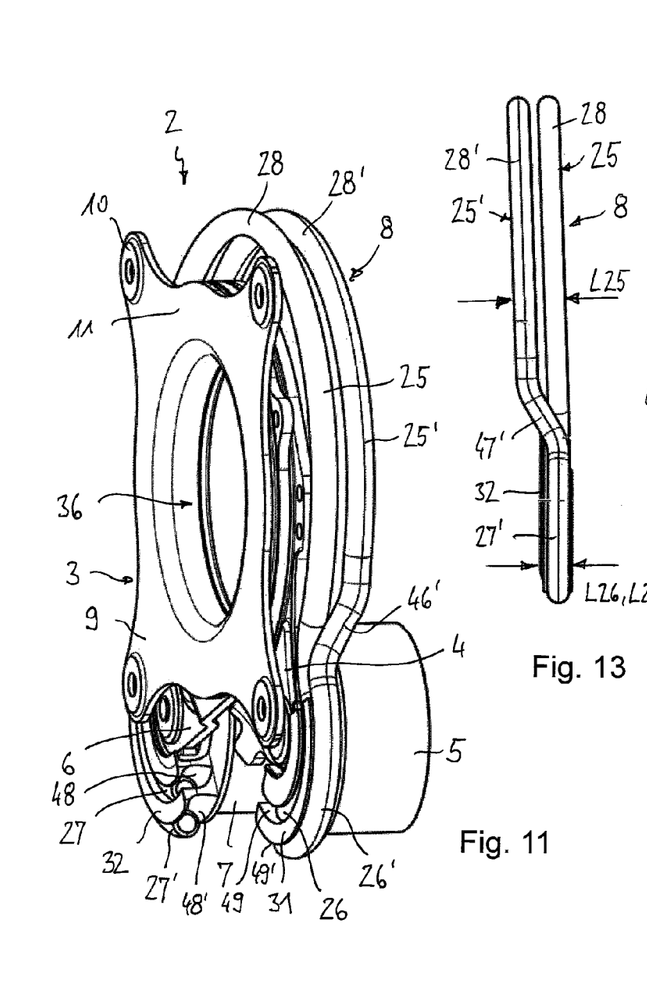
FIG. 11 illustrates a further example of a belt tensioning device in a perspective view.
FIG. 13 illustrates the spring arrangement of the belt tensioning device of FIG. 11 as a detail in a side view.
Figure 12:
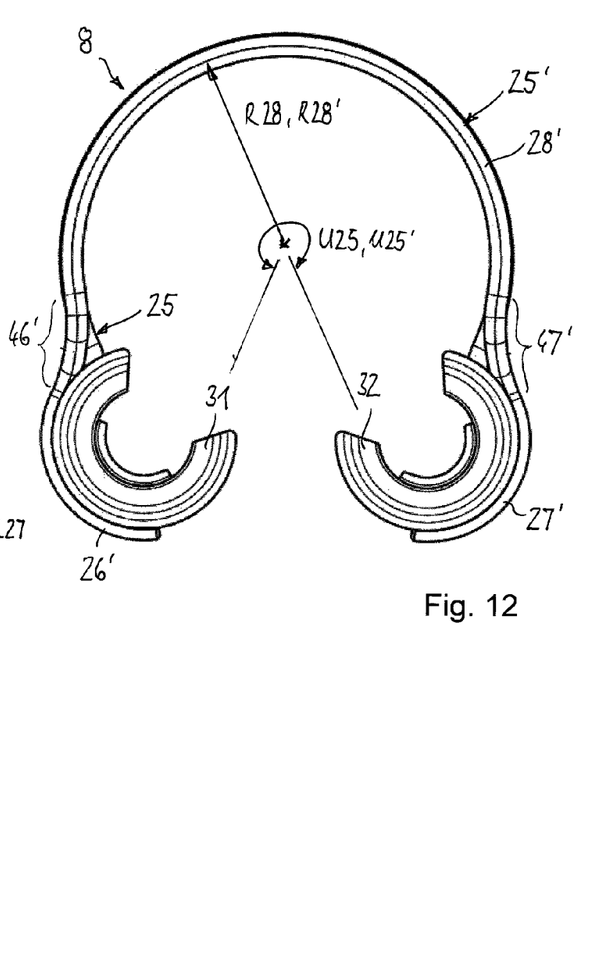
FIG. 12 illustrates the spring arrangement of the belt tensioning device of FIG. 11 as a detail in a top view.

FIGS. 11 to 13, which are described jointly below, show a belt tensioning device 2 including a spring arrangement 8 in a further embodiment. The present belt tensioning device 2 corresponds in many parts to the embodiment of FIGS. 1 to 6, and to the embodiment of FIGS. 9 and 10, respectively, so that as far as common features are concerned, it is referred to the above description. The same or modified components are provided with the same reference numerals as in the above named Figures.

A characteristic design feature of the present embodiment refers to the spring arrangement 8. The spring arrangement 8 presently comprises two bow-shaped springs 25, 25' which are formed differently. The first bow-shaped spring 25 is formed as in the embodiment of FIGS. 1 to 6 and forms a spring plane. The second bow-shaped spring 25' is formed similar to the first bow-shaped spring 25, wherein the support portions 26', 27' of the second bow-shaped spring 25' and the support portions 26, 27 of the first bow-shaped spring 25 are arranged in a common spring plane, but the spring portion 28' of the second bow-shaped spring 25' is parallel offset to the spring portion 28 of the first spring 25. For this the second bow-shaped spring 25' has gradient portions 46', 47' arranged between the support portions 26', 27', more particularly adjoin the support portions 26', 27' in circumferential direction. The gradient portions 46', 47' have an axial gradient component and connect the support portions 26', 27' arranged in the first spring plane to the spring portion 28' arranged in the parallel second spring plane. The support portions 26, 27 of the first bow-shaped spring 25 are arranged coaxially within the second support portions 26', 27' of the second bow-shaped spring 25'. Correspondingly, the support elements 31, 32 also have two annular grooves 48, 49; 48', 49', arranged coaxially to each other, and in which the end portions 26, 27; 26', 27' of the two springs 25, 25' are accommodated. The two spring portions 28, 28' are arranged coaxially to each other and axially offset to each other. Between the two springs 25, 25', a distance is formed along the whole spring length, i.e. the whole circumferential extension, so that the springs do not contact each other during operation.

For all above described embodiments an advantage is that the belt tensioning device 2 has a particularly flat structure in axial direction due to the design of the bow-shaped springs 25, 25' with shortened axial length in the area of the tensioning rolls 5, 7. The spring arrangement 8, 8' has a minimal axial height in the circumferential portions, in which the tensioning rollers 5, 7 are arranged. This contributes to an overall axially compact design of the belt tensioning device 2.

The invention claimed is:

1. A belt tensioning device comprising:
a base member that includes an opening for a drive shaft of an accessory and an attachment portion;
a first tensioning arm that is pivotably supported on the base member around a first pivot axis by a first bearing and has a first tensioning roller that is rotatable around a first axis of rotation;
a second tensioning arm that is pivotably supported on the base member around a second pivot axis by a second bearing, and that has a second tensioning roller that is rotatable around a second axis of rotation;
a spring arrangement that is arranged between the first tensioning arm and the second tensioning arm such that the first tensioning arm and the second tensioning arm are pretensioned in circumferential direction relative to each other by the spring arrangement;
wherein the spring arrangement comprises at least one bow-shaped spring that has a circumferential extension of less than 360° around the first and the second pivot axis,
wherein the at least one bow-shaped spring has a first support portion that is supported on the first tensioning arm, and a second support portion that is supported on the second tensioning arm, as well as a spring portion extending between the first support portion and the second support portion,
wherein the at least one bow-shaped spring has an axial length in the area of the first and the second support portion, which axial length is shorter than a total axial length of the bow-shaped spring.

2. The belt tensioning device of claim 1,
wherein a cross-sectional area of the bow-shaped spring is constant along the circumferential extension, wherein at least a central region of the spring portion is axially offset relative to the first and the second support portion in a direction towards a center plane formed by the first and the second tensioning roller.

3. The belt tensioning device of claim 1,
wherein the spring portion has a gradient region with an axial gradient component along at least a circumferential extension portion of the bow-shaped spring.

4. The belt tensioning device of claim 1,
wherein the at least one bow-shaped spring has a smaller axial length in the first and the second support portion than at least in a central region of the spring portion.

5. The belt tensioning device of claim 1,
wherein the spring arrangement is formed mirror-symmetrically in an axial view.

6. The belt tensioning device of claim 1,
wherein the bow-shaped spring is produced from a round wire or square wire.

7. The belt tensioning device of claim 1,
wherein the spring arrangement comprises two bow-shaped springs, which are connected to each other by at least one connection element.

8. The belt tensioning device of claim 7,
wherein the first support portions of the two bow-shaped springs are connected to a first support element, and that the second support portions of the two bow-shaped springs are connected to a second support element.

9. The belt tensioning device of claim 7,
wherein the two bow-shaped springs are formed identically and are arranged axially offset to each other.

10. The belt tensioning device of claim 7,
wherein the two bow-shaped springs are formed differently, wherein the first and second support portions of the two bow-shaped springs are arranged in one plane, and wherein the spring portions of the two bow-shaped springs are arranged axially offset to each other at least in a central region.

11. The belt tensioning device of claim 10,
wherein the two bow-shaped springs have same radii in the spring portion, and the support portions of the two bow-shaped springs have different radii.

12. The belt tensioning device of claim 1,
wherein at least one of the base member, the first tensioning arm and the second tensioning arm is a sheet metal part from a steel sheet.

13. The belt tensioning device of claim 12,
wherein the sheet thickness of at least one of the base member, the first tensioning arm and the second tensioning arm is less than a wire diameter of the bow-shaped spring, wherein the total axial length of the base member is shorter than three times a wire diameter of the bow-shaped spring.

14. The belt tensioning device of claim 1,
wherein pairs of support faces are formed between the base member and the first tensioning arm, between the first tensioning arm and the second tensioning arm, as well as between the second tensioning arm and the base member, wherein an annular seal is provided at least between one of the pairs of support faces.

15. The belt tensioning device of claim 14,
wherein one of the annular seal and one of the bearings are manufactured jointly by two-component-injection molding.

16. The belt tensioning device of claim 14,
wherein one of the annular seal and one of the base member, the first tensioning arm, the second tensioning arm, are connected to one another.

17. The belt tensioning device of claim 1,
wherein a first central bearing plane is formed by bearings supporting the tensioning rollers at the tensioning arms, and that a second central bearing plane is formed by the bearings supporting the tensioning arms on the base member,
wherein the first central bearing plane and the attachment portion for attaching the base member are arranged on different sides of the second central bearing plane, or
wherein the second central bearing plane and the attachment portion for attaching the base member are arranged on different sides of the first central bearing plane.

* * * * *